Patented Apr. 5, 1932

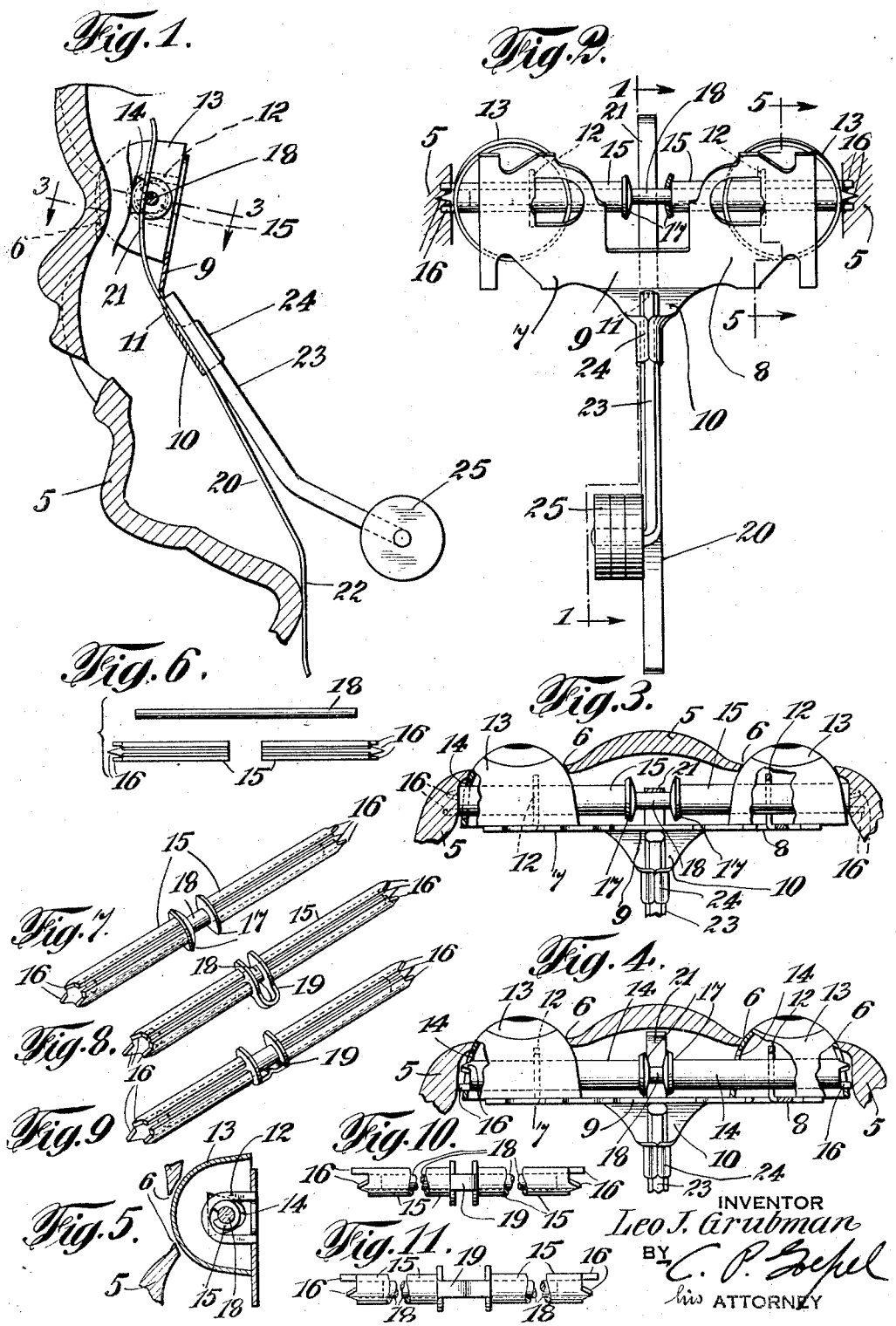

1,852,301

UNITED STATES PATENT OFFICE

LEO J. GRUBMAN, OF BELLE HARBOR, NEW YORK, ASSIGNOR TO MARGON CORPORATION, OF NEW YORK, N. Y., A CORPORATION OF NEW YORK

EYE MOUNTING FOR DOLLS

Application filed June 8, 1929. Serial No. 369,323.

This invention relates to eye mountings for dolls, and has for its general object and purpose to provide a simply constructed device of this character including means whereby the mounting may be easily and quickly attached in operative position within the doll head with the eye members in accurate relation to the eye sockets or openings and which will permit of a limited inward movement of the eye members with respect to the walls of the eye sockets, thereby obviating the possibility of retarded or sluggish oscillation of the eye members in the event of unevenness of the eye socket walls or the lodgement of dirt or other obstructions between said walls and the surfaces of the eye members.

More particularly, in one practical embodiment of the invention, my improved eye mounting includes a frame together with the two eye members contacting with one side of said frame and means for oscillatably supporting the frame and eye members including elements movable in opposite axial directions and having means to impale opposite sides of the doll head wall. The frame and the eye members are provided with means cooperating with said elements which permits of a limited inward bodily movement of said frame and the eye members as a unit with respect to the supporting elements, said frame being further provided with means acting to normally yieldingly urge the frame and eye members forwardly and to hold the spherical surfaces of the eye members in contact with the walls of the respective eye sockets.

It is also one of the detail objects of the invention to provide said axially movable supporting elements in the form of sheet metal tubes having projecting spurs at one end to impale the wall structure of the doll head, and a means connecting said tubes and serving as a mutual support therefor.

With the above and other objects in view, the invention consists in the improved eye mounting and in the form, construction and relative arrangement of its several parts as will be hereinafter more fully described, illustrated in the accompanying drawings, and subsequently incorporated in the subjoined claims.

In the drawings, wherein I have disclosed one simple and satisfactory embodiment of the invention, and in which similar reference characters designate corresponding parts throughout the several views,—

Figure 1 is a vertical fragmentary sectional view through a doll head indicated approximately by the line 1—1 in Fig. 2, and showing one embodiment of my improved eye mounting arranged therein;

Fig. 2 is a rear elevation of the eye mounting, certain parts being shown in section;

Fig. 3 is a horizontal sectional view taken on the line 3—3 of Fig. 1, and showing the oscillatory frame and the eye members inwardly repressed with respect to the supporting means and the walls of the eye sockets;

Fig. 4 is a view similar to Fig. 3 showing the mounting as arranged in the doll head prior to its final attachment;

Fig. 5 is a detail sectional view taken on the line 5—5 of Fig. 2, the frame and the eye member being shown in the position indicated in Fig. 3 of the drawings;

Fig. 6 is a detail elevation of the several parts of the supporting means in separated relation;

Fig. 7 is a perspective view showing the parts illustrated in Fig. 6 in assembled relation;

Fig. 8 is a perspective view of a modified form of the supporting means before attachment to the wall of the doll head;

Fig. 9 is a similar view of said supporting means after attachment, and

Figs. 10 and 11 are fragmentary elevations illustrating the modified form of the supporting means for the eye mounting as shown in Figs. 8 and 9 respectively.

For the purpose of illustrating the manner of application of my improved eye mounting, in the accompanying drawings, I have shown a part of a doll head 5, which may be molded or otherwise fashioned from wood pulp, papier-mâché or other suitable composition material. The front wall of this doll head is provided with the usual spaced eye sockets indicated at 6, arranged in appropriate relation to the other molded facial features of the doll head.

The new eye mounting forming the subject matter of this application includes a stamped sheet metal frame plate 7 which may be of any preferred general form and dimensions, but as herein shown, is provided with oppositely projecting relatively wide lateral portions 8 having their lower portions connected by the central relatively narrow part 9 of the frame plate. This central part of the frame plate is provided with an obliquely disposed extension 10 at the front end of which an opening indicated at 11 is formed through the part 9. The purpose of this construction will be hereinafter explained.

Each part 8 of the frame plate has a slotted ear or guide loop 12 struck therefrom and extended from one side of the plate at right angles to the plane thereof.

The eye members indicated at 13 may consist of substantially semi-spherical shells of celluloid or other material upon the spherical surfaces of which the eye pupils are painted or otherwise delineated. The wall of each eye shell at opposite sides thereof and adjacent its rear edge is provided with an elongated opening 14 therethrough, the lengthwise dimension of the opening being disposed diametrically of the eye shell and said opening preferably decreasing or tapering in width towards the rear open end of the shell as clearly shown in Fig. 5 of the drawings.

The attaching and supporting means for the frame 7 and eye shells 13 whereby they are sustained within the doll head for oscillatory movement may be of several different forms, certain of which I have illustrated in Figs. 6 to 11 of the drawings. As shown in Figs. 6 and 7, the attaching and supporting means may consist of the two sheet metal tubes 15 each of which is provided at one of its ends with a plurality of longitudinally projecting attaching spurs 16. The other ends of the tubes are closed by the caps or end plates 17 with the exception of an opening through each of said plates through which a connecting rod 18 extends. This connecting rod has close frictional engagement with the walls of each tube and extends a greater portion of the length thereof, the opposite ends of the rod terminating adjacent to the attaching spurs 16 on the outer ends of the respective tubes. The plates 17 preferably are of concavo-convex form and between the outer convex surfaces of these plates, relatively movable parts of a suitable tool are adapted to be inserted so as to move the tubes 15 axially in relatively opposite directions along the rod 18 and impale the spurs 16 of said tubes in the relatively opposite sides of the doll head wall.

In the form of the attaching and supporting means for the eye mounting as shown in Figs. 8 to 11, in addition to the parts above referred to, I integrally connect the end plates or caps 17 of the relatively movable tubes by the relatively narrow metal strip 19 which will readily flex or bend from the looped form shown in Fig. 8 to the substantially straight form extending parallel to the rod 18 between the caps 17 as the two tubes are forced apart to their attached positions. This provides an additional connecting means between the tubes and supplements the connecting rod 18 to rigidly sustain said tubes in the attached position.

A relatively light and long leaf spring 20 is arranged upon one side of the oblique extension 10 of the frame plate 7, said spring being disposed through the opening 11 and having one end curved as at 21 and extending upwardly in spaced relation to the front side of the frame for bearing contact upon the central portion of the rod 18 as clearly shown in Figs. 1 and 3 of the drawings. The lower end of said leaf spring 20 is angularly bent as indicated at 22 and is adapted to contact against the neck wall of the doll head at one side thereof to yieldingly cushion the oscillating motion of the eye setting to the position shown in Fig. 1 of the drawings.

A pendulum rod 23 has a weight means 24 suitably attached to one end thereof. This rod is preferably of polygonal form in cross section and the other end of said rod is positioned upon the portion of the leaf spring 20 which extends over the obliquely disposed extension 10 of the frame plate. This part of the frame plate at the opposite side edges thereof is provided with flanges indicated at 24 which are bent over and closely clinched upon the angularly related surfaces of the pendulum rod 23. Thus by this means, I rigidly fix the pendulum rod and the spring 20 to the frame plate without necessitating the use of rivets or other additional fastening or securing devices.

In assembling the several parts of the device as above described, the eye members 13 are first arranged with their rear edges in contact against the front surfaces of the respective parts 8 of the frame plate, the ears or loops 12 on said frame parts projecting within the respective eye members. The supporting elements or tubes 15 are then disposed through the openings 14 in the opposite sides of the respective eye shells and through the frame ear 12 which is associated therewith, said sleeves being adjusted along the connecting rod 18 to substantially the position shown in Fig. 4 of the drawings, in which it will be noted that the upper end of the spring 20 extends between the inner end plates 17 on said tubes and is engaged with the convex surfaces thereof. The frame and the supporting means therefor are thus yieldingly urged towards each other by the spring, and the tubes 15 are disposed in the rear ends of the tapering openings 14 of the eye shells in contact with the upper and lower edges thereof. The device is now arranged within the doll head as shown in Fig. 4 and with the peripheral surfaces of the respective eye members 13 in close contact against the walls of the respective eye sockets 6. By means of the tool, the tubes 18 are now spread apart or moved laterally in relatively opposite directions to thereby securely impale the prongs or spurs 16 in the structure of the doll head wall at the opposite sides thereof. In this manner, it will be understood that the point of attachment of these spurred ends of the tubes is determined in each individual head by the formation of the walls of the eye sockets. Thus, although these eye sockets may be inaccurately milled or out of proper horizontal alignment, the accurate oscillation of the respective eye members and with relation to the walls of the individual eye sockets, is assured.

As indicated in Fig. 3 of the drawings, after attachment of the mounting to the wall of the doll head, the upper end of the spring 20 bears against the front side of the rod 18 between the inner opposed ends of the tubes 15, and thus acts to yieldingly urge the suspended frame 7 together with the eye members in contact against the front side of said frame forwardly, maintaining a constant light pressure of the peripheral surfaces of the eye members against the walls of the eye sockets. However, in the event that the walls of the sockets may be rough or unevenly milled, or an obstruction lodges between said walls and the eye members, then said eye members together with the frame 7 may readily move rearwardly or inwardly against the action of the spring 20 with respect to the relatively fixed supporting tubes 15. It will also be noted from reference to Fig. 4 that when the sleeves 15 are separated and moved to their attached positions, the spring 20 which was between the inner ends of said sleeves will then move into bearing contact against the rod 18. Such movement will be transmitted to the frame 7 to a sufficient extent to ease up or relieve the tight frictional pressure of the walls of the eye shells against the socket walls while maintaining substantial contact therebetween in the normal condition of the device. Accordingly, the free and unretarded oscillation of the eye members upon the socket walls is assured in the swinging or oscillating motion of the mounting relative to the attaching and supporting means therefor.

It will of course, be understood that when the doll head is inclined from the position of Fig. 1 or exposed in a horizontal position, the frame 7 will swing under the gravity action of the weight 24, thus transmitting motion to the eye members and moving the same to the closed positions where the eye pupils are concealed by the front wall of the doll head below the respective eye sockets. Such movement of the mounting is yieldingly limited by contact of the upper extremity of the spring 20 against the front wall of the doll head, while as above noted, the return movement of the eyes to the open position is yieldingly limited and cushioned by contact of the lower end portion 22 of the spring with the neck wall of the doll head.

From the foregoing description considered in connection with the accompanying drawings, the construction of my improved eye mounting as well as the manner and application of use, together with the several advantages thereof will be clearly understood. It will be noted that the several parts are of very simple mechanical form so that a mounting of this kind can be manufactured in large quantities at relatively small cost. The attachment of the mounting in proper position within the doll can be easily and quickly made without necessitating a high degree of skill, or requiring any special structural changes in the doll head itself so that the invention is capable of use in connection with the various standard forms of doll heads now known in the art. I have herein shown and described several desirable forms of the essential features of my present invention, but it is nevertheless to be understood that such features might also be incorporated in various other alternative mechanical structures, and I accordingly reserve the privilege of resorting to all such legitimate changes therein as may be fairly embodied within the spirit and scope of the invention as claimed.

I claim:

1. In combination with a doll head having spaced eye sockets, an eye mounting including a frame, spaced eye members having contact at their rear edges with the front side of said frame and adapted for oscillatory engagement with the walls of the respective eye sockets, and supporting and attaching means retaining the frame and eye members in assembled relation including parts having integrally formed means fixed in opposite sides of the doll head wall, and said frame and eye members having means cooperating with said parts to hold the frame and eye members together and permitting of a limited inward movement of the frame and eye members with respect to the attaching and supporting means.

2. In combination with a doll head having spaced eye sockets, an eye mounting including a frame, spaced eye members having contact at their rear edges with the front side of said frame and adapted for oscillatory engagement with the walls of the respective eye sockets, and supporting and attaching means retaining the frame and eye members in assembled relation including parts having integrally formed means fixed in opposite sides of the doll head wall, and said frame and eye members having means cooperating with said parts to hold the frame and eye members together and permitting of a limited inward movement of the frame and eye members with respect to the attaching and supporting means, and a spring carried by the frame yieldingly urging the frame and eye members forwardly to retain the surfaces of said eye members in rocking contact with the walls of the respective sockets.

3. In combination with a doll head having spaced eye sockets, an eye mounting including a frame, spaced eye members having contact at their rear edges with the front side of said frame and adapted for oscillatory engagement with the walls of the respective eye sockets, and supporting and attaching means retaining the frame and eye members in assembled relation including parts having integrally formed means fixed in opposite sides of the doll head wall, and said frame and eye members having means cooperating with said parts to hold the frame and eye members together and permitting of a limited inward movement of the frame and eye members with respect to the attaching and supporting means, and a spring attached to said frame having a part resiliently bearing upon said attaching and supporting means to yieldingly urge the frame and eye members forwardly and retain the peripheral surfaces of the eye members in rocking contact upon the walls of the respective eye sockets.

4. In combination with a doll head having spaced eye sockets, an eye mounting including a frame, eye members having their rear ends in bearing contact with the front side of the frame and adapted for oscillatory engagement with the walls of the respective eye sockets, attaching and supporting means for the eye mounting consisting of axially aligned relatively movable parts and connecting means therebetween, said parts having prongs at their outer ends impaled in the wall of the doll head upon axial movement of said parts away from each other, said frame and eye members having means cooperating with the respective attaching parts to hold the frame and eye members together and permit of a limited rearward movement of said frame and eye members relative to said parts, and a spring attached to said frame and cooperating with the attaching and supporting means to yieldingly urge the frame and eye members forwardly relative to said means and retain the peripheral surfaces of the eye members in rocking engagement with the walls of the respective eye sockets.

5. In combination with a doll head having spaced eye socket, an eye mounting including a frame, spaced eye members contacting at their rear edges with the front side of said frame and adapted for oscillating contact with the walls of the respective eye sockets, attaching and supporting means for said mounting including axially aligned metal tubes having attaching prongs at their outer ends embedded in the side walls of the doll head upon relative movement of said tubes away from each other, a connecting rod telescopically engaged in the tubes and having frictional bearing contact with the walls thereof, said frame and eye members having means coacting with said tubes to permit of a limited rearward movement of the frame and eye members relative thereto, and a spring attached to the frame and bearing against the front side of said rod to yieldingly urge the frame and eye members forwardly and hold the peripheral surfaces of said members in oscillating contact upon the walls of the eye sockets.

6. In combination with a doll head having spaced eye sockets, an eye mounting including a frame, spaced eye members contacting at their rear edges with the front side of said frame and adapted for oscillating contact with the walls of the respective eye sockets, attaching and supporting means for said mounting including axially aligned metal tubes having attaching prongs at their outer ends embedded in the side walls of the doll head upon relative movement of said tubes away from each other, a connecting rod telescopically engaged in the tubes and having frictional bearing contact with the walls thereof, said frame and eye members having means coacting with said tubes to permit of a limited rearward movement of the frame and eye members relative thereto, said frame being centrally provided with a depending angular extension, a leaf spring having its intermediate portion disposed upon said extension, said frame having an opening therein through which the spring extends upwardly, the upper end portion of the spring bearing against the front side of said rod to yieldingly urge the frame and eye members forwardly and retain the peripheral surfaces of the eye members in bearing contact with the walls of the eye sockets, a pendulum, said frame having integrally formed means rigidly securing the pendulum and the spring thereto, and the lower end of said spring having a part contacting with the neck wall of the doll head to yieldingly cushion the oscillating movement of the eye mounting in one direction.

7. In combination with a doll head having spaced eye sockets, an eye mounting including a frame, spaced eye members contacting at their rear edges with the front side of said frame and adapted for oscillating contact with the walls of the respective eye sockets, attaching and supporting means for said mounting including axially aligned metal tubes having attaching prongs at their outer ends embedded in the side walls of the doll head upon relative movement of said tubes away from each other, a connecting rod telescopically engaged in the tubes and having frictional bearing contact with the walls thereof, said frame and eye members having means coacting with said tubes to permit of a limited rearward movement of the frame and eye members relative thereto, said frame being centrally provided with a depending angular extension, a leaf spring having its intermediate portion disposed upon said extension, said frame having an opening therein through which the spring extends upwardly, the upper end portion of the spring bearing against the front side of said rod to yieldingly urge the frame and eye members forwardly and retain the peripheral surfaces of the eye members in bearing contact with the walls of the eye sockets, a pendulum, said frame having integrally formed means rigidly securing the pendulum and the spring thereto, and the lower end of said spring having a part contacting with the neck wall of the doll head to yieldingly cushion the oscillating movement of the eye mounting in one direction, the upper end of the spring extending above the eye mounting and adapted for yieldable contact at its extremity against the front wall of the doll head to limit the oscillating movement of the mounting in the opposite direction.

8. In an eye mounting for dolls, a frame, spaced eye members having bearing contact against the front side of the frame, supporting and attaching means for the eye mounting, said frame and eye members having means with which the supporting and attaching means coacts to retain the frame and eye members in assembled relation, a vertically extending leaf spring having an intermediate portion thereof bearing on a part of the frame, a pendulum having a rod engaged upon said part of the spring, and means integral with the frame rigidly clamping the pendulum and spring thereto, said spring extending above the frame and adapted to contact with the front wall of a doll head to limit oscillatory motion of the mounting in one direction, and said spring having a lower end portion adapted to contact with the neck wall of the doll head to limit oscillatory motion of the mounting in the opposite direction.

9. A device for oscillatably supporting a doll's eye setting comprising relatively separable parts each provided with an annular series of wall impaling teeth at one of its ends, and a connecting bridge member frictionally engaging and guiding said parts.

10. A device for oscillatably supporting a doll's eye setting comprising a rod, and separable attaching members frictionally supported and guided by said rod, each of said members being provided at one end with an annular series of teeth adapted to impale one of the side walls of a doll head.

11. A device for oscillatably supporting a doll's eye setting comprising a supporting rod, separable sleeve members engaged upon said rod for axial movement relative thereto, each of said sleeve members at its outer end having its wall provided with an annular series of teeth adapted to impale the structure of the doll head wall upon relative separation of said sleeves with respect to the supporting rod.

12. A supporting device for eye settings for dolls comprising axially aligned tubular members, means connecting and frictionally resisting relative axial movement of said members, and each of said members being provided at one of its ends and at opposite sides of its axis with projecting teeth adapted to impale the wall of a doll head.

13. A supporting device for oscillatory dolls' eyes comprising a pair of axially aligned tubular members, each adapted to constitute a bearing support for one of the eyes, said tubular members being open at their inner opposed ends, a connecting rod telescopically engaged within said tubular members and frictionally resisting their relative movement, and each of said members being provided at its other end with means adapted to engage the wall of a doll head to sustain said members in fixed relation thereto.

In testimony that I claim the foregoing as my invention, I have signed my name hereto.

LEO J. GRUBMAN.